(12) United States Patent
Donderici et al.

(10) Patent No.: US 10,429,534 B2
(45) Date of Patent: Oct. 1, 2019

(54) GRADIENT-BASED SINGLE WELL RANGING SYSTEM FOR SAGD APPLICATION

(71) Applicant: Halliburton Energy Services Inc., Houston, TX (US)

(72) Inventors: Burkay Donderici, Houston, TX (US); Clinton Moss, Houston, TX (US); Mac Upshall, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 302 days.

(21) Appl. No.: 14/440,329

(22) PCT Filed: Dec. 6, 2013

(86) PCT No.: PCT/US2013/073706
§ 371 (c)(1),
(2) Date: May 1, 2015

(87) PCT Pub. No.: WO2014/089505
PCT Pub. Date: Jun. 12, 2014

(65) Prior Publication Data
US 2015/0268371 A1    Sep. 24, 2015

Related U.S. Application Data

(60) Provisional application No. 61/734,677, filed on Dec. 7, 2012, provisional application No. 61/735,426, filed on Dec. 10, 2012.

(51) Int. Cl.
*G01V 3/00* (2006.01)
*G01V 3/26* (2006.01)
(Continued)

(52) U.S. Cl.
CPC .......... *G01V 3/26* (2013.01); *E21B 47/02216* (2013.01); *G01V 3/02* (2013.01);
(Continued)

(58) Field of Classification Search
CPC ... G01V 3/18; G01V 3/20; G01V 3/26; G01V 3/02; G01V 3/08; G01V 3/081; G01V 3/082
(Continued)

(56) References Cited

U.S. PATENT DOCUMENTS

| 3,731,752 A | 5/1973 | Schad | |
| 4,323,848 A * | 4/1982 | Kuckes | G01V 3/26 |
| | | | 324/247 |

(Continued)

FOREIGN PATENT DOCUMENTS

| WO | WO 2011/051435 A2 | 5/2011 |
| WO | WO 2012/009375 A1 | 1/2012 |
| WO | WO 2012/068119 A2 | 5/2012 |

OTHER PUBLICATIONS

International Search Report and the Written Opinion of the International Searching Authority, or the Declaration, dated Apr. 16, 2014, PCT/US2013/073706, 10 pages, ISA/US.
(Continued)

*Primary Examiner* — Giovanni Astacio-Oquendo
*Assistant Examiner* — Raul J Rios Russo
(74) *Attorney, Agent, or Firm* — Haynes and Boone, LLP

(57) ABSTRACT

A tool, method and system for ranging between two wellbores. The target wellbore includes a conductive member disposed within a portion of the target wellbore. An investigative wellbore includes an electromagnetic gradiometer positioned within the wellbore, as well as emitter electrode and return electrode spaced apart along an investigative wellbore, preferably in the process of being drilled. The
(Continued)

position of the emitter electrode and the return electrode are selected to optimize current transmission to the target wellbore in order to enhance the electromagnetic field emanating from the conductive member at a desired point along the conductive member. Where the electrodes and gradiometer are carried by a drill string, gap subs are positioned along the drill string to minimize conduction of current along the drill string therebetween. In some embodiments, the gradiometer is positioned between the emitter and return electrodes.

32 Claims, 9 Drawing Sheets

(51) Int. Cl.
 G01V 3/18 (2006.01)
 G01V 3/02 (2006.01)
 G01V 3/20 (2006.01)
 G01V 3/08 (2006.01)
 E21B 47/022 (2012.01)
(52) U.S. Cl.
 CPC ............... *G01V 3/08* (2013.01); *G01V 3/081* (2013.01); *G01V 3/18* (2013.01); *G01V 3/20* (2013.01); *G01V 3/082* (2013.01)
(58) Field of Classification Search
 USPC ....... 324/303, 333, 338, 351, 323, 376, 345, 324/346
 See application file for complete search history.

(56) References Cited

U.S. PATENT DOCUMENTS

| | | | |
|---|---|---|---|
| 4,372,398 A | 2/1983 | Kuckes | |
| 4,700,142 A * | 10/1987 | Kuckes | G01V 3/26 166/66.5 |
| 4,933,640 A | 6/1990 | Kuckes | |
| 5,230,387 A | 7/1993 | Waters et al. | |
| 5,512,830 A | 4/1996 | Kuckes | |
| 5,582,248 A | 12/1996 | Estes | |
| 2002/0112856 A1* | 8/2002 | Van Steenwyk | E21B 47/02216 166/255.1 |
| 2003/0038634 A1* | 2/2003 | Strack | G01V 11/00 324/323 |
| 2003/0184299 A1* | 10/2003 | Strack | G01V 11/00 324/323 |
| 2004/0196047 A1 | 10/2004 | Fanini et al. | |
| 2007/0126426 A1* | 6/2007 | Clark | E21B 47/02216 324/326 |
| 2007/0168134 A1* | 7/2007 | Strack | G01V 3/24 702/7 |
| 2007/0278008 A1 | 12/2007 | Kuckes | |
| 2009/0030615 A1* | 1/2009 | Clark | G01V 3/26 702/7 |
| 2009/0261986 A1* | 10/2009 | Mehta | G01V 11/002 340/853.6 |
| 2009/0272578 A1* | 11/2009 | MacDonald | C10G 21/22 175/26 |
| 2010/0155138 A1 | 6/2010 | Kuckes | |
| 2010/0219918 A1 | 9/2010 | Higuchi | |
| 2011/0018542 A1* | 1/2011 | Clark | E21B 47/02216 324/326 |
| 2011/0248716 A1* | 10/2011 | Folberth | G01V 3/24 324/338 |
| 2012/0067644 A1* | 3/2012 | Goswami | E21B 47/02216 175/45 |
| 2012/0109527 A1* | 5/2012 | Bespalov | E21B 47/02216 702/7 |
| 2012/0169344 A1* | 7/2012 | Rabinovich | G01V 3/28 324/339 |
| 2013/0319659 A1* | 12/2013 | Freedman | E21B 7/04 166/250.01 |
| 2015/0021094 A1* | 1/2015 | MacDonald | C10G 21/22 175/48 |
| 2016/0273337 A1* | 9/2016 | Donderici | E21B 47/02216 |

OTHER PUBLICATIONS

Partial Supplementary European Search Report for Patent Application No. 13859890, dated Sep. 1, 2016, 7 pages.
European Examination Report for Patent Application No. 13859890, dated Oct. 2, 2017, 7 pages.

* cited by examiner

GRADIENT-BASED SINGLE WELL RANGING SYSTEM FOR SAGD APPLICATION

PRIORITY

This application is a U.S. National Stage patent application of and claims priority to International Patent Application No. PCT/US2013/073706, filed on Dec. 6, 2013, claims priority to U.S. Provisional Application No. 61/734,677 entitled, "Gradient-based Single Well Ranging System for SAGD Application," filed Dec. 7, 2012, and U.S. Provisional Application No. 61/735,426 entitled, "Gradient-based Single Well Ranging System for SAGD Application," filed Dec. 10, 2012, the disclosures of which are hereby incorporated by reference in their entireties.

FIELD OF THE DISCLOSURE

The disclosure relates to wellbore drilling operations, and more particularly to methods and systems for tracking the drilling of multiple wellbores relative to one another. Most particularly, the disclosure relates to methods and systems for determining the relative location of a reference wellbore from a wellbore being drilled using magnetic gradients.

BACKGROUND OF THE DISCLOSURE

As easy-to-access and easy-to-produce hydrocarbon resources are depleted, there is an increased demand for more advanced recovery procedures. One such procedure is steam assisted gravity drainage (SAGD), a procedure that utilizes steam in conjunction with two spaced apart wellbores. Specifically, SAGD addresses the mobility problem of heavy oil in a formation through the injection of high pressure, high temperature steam into the formation. This high pressure, high temperature steam reduces the viscosity of the heavy oil in order to enhance extraction. The injection of steam into the formation occurs from a first wellbore (injector) that is drilled above and parallel to a second wellbore (producer). As the viscosity of the heavy oil in the formation around the first wellbore is reduced, the heavy oil drains into the lower second wellbore, from which the oil is extracted. Preferably, the two wellbores are drilled at a distance of only a few meters from one other. The placement of the injector wellbore needs to be achieved with very small margin in distance. If the injector wellbore is positioned too close to the producer wellbore, the producing wellbore would be exposed to very high pressure and temperature. If the injector wellbore is positioned too far from the producer wellbore, the efficiency of the SAGD process is reduced. In order to assist in ensuring that the second wellbore is drilled and positioned as desired relative to the first wellbore, a survey of the two wellbores in the formation is often conducted. These surveying techniques are traditionally referred to as "ranging".

Electromagnetic (EM) systems and methods are commonly employed in ranging to determine direction and distance between two wellbores. In EM ranging systems, an elongated conductive pipe string, such as the wellbore casing, is disposed in one of the wellbores. This wellbore is typically referred to as the "target" wellbore and usually represents the SAGD injector wellbore. In any event, a current is applied to the target wellbore conductive pipe string by a low-frequency current source. Currents flow along the wellbore casing and leak into the formation. The currents result in an EM field around the target wellbore. The EM fields from the currents on the target wellbore casing are measured using an electromagnetic field sensor system disposed in the other wellbore, which is typically the wellbore in the process of being drilled. This second wellbore usually represents the SAGD producer wellbore. The measured magnetic field can then be utilized to determine distance, direction and angle between two wellbores. Ranging systems in which a current is injected into the target wellbore in order to induce a magnetic field are referred to as "active" ranging systems.

One solution that has been employed in EM ranging is to use ranging devices to directly sense and measure the distance between two wells as the latter wellbore is drilled. Two well-known commercial approaches that employ equipment in both wells (injector and producer) are based either on rotating magnets or magnetic guidance techniques. However, these approaches are undesirable in that they require two separate and different teams to manage the equipment in each wellbore, namely, a wireline team at the producer wellbore and a logging while drilling team at the injector wellbore, which is not cost effective. One prior art approach utilizes equipment in only a single wellbore (the injector wellbore) to transmit a current to a target wellbore (the producer wellbore), after which an absolute magnetic field measurement is used to calculate distance. One significant drawback to this method is that the approach can yield unreliable results due to variations of the current on the target pipe.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements. The drawing in which an element first appears is generally indicated by the left-most digit in the corresponding reference number.

DETAILED DESCRIPTION

Figure 1:
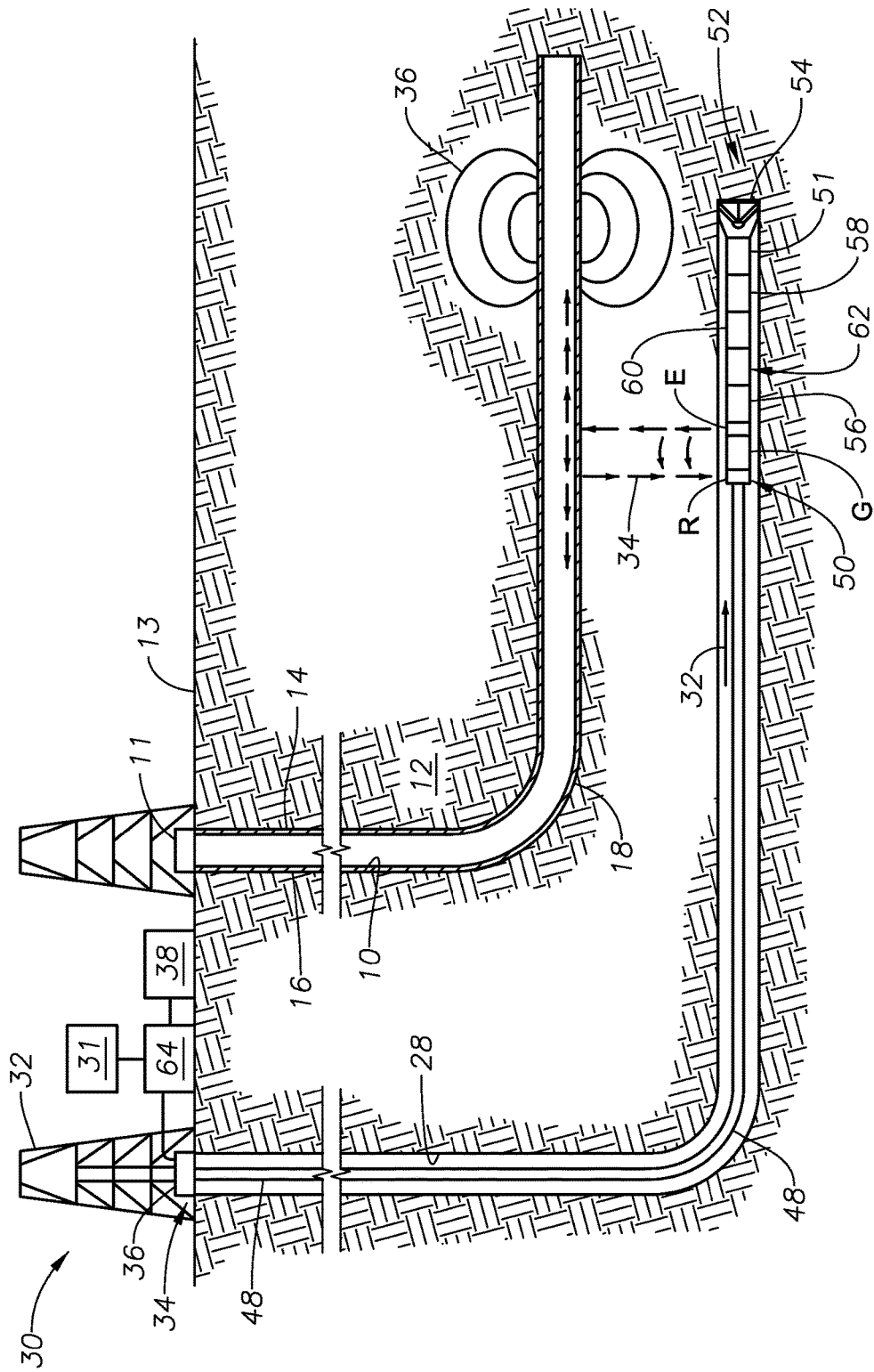
FIG. 1 illustrates an embodiment of a gradient-based single wellbore ranging system in a SAGD drilling operation.

The foregoing disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper," "uphole," "downhole," "upstream," "downstream," and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures. For example, if the apparatus in the figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Figure 2:
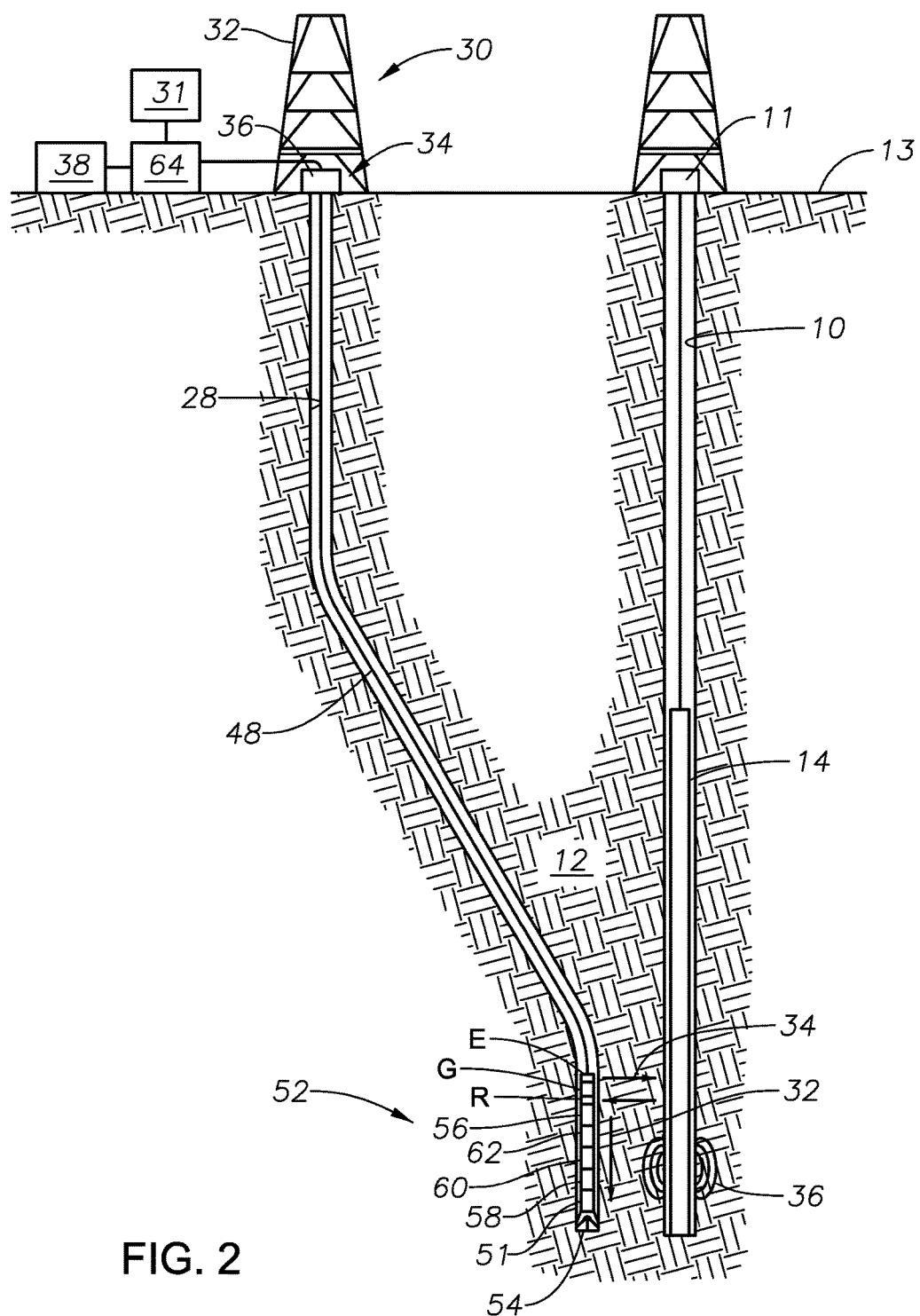
FIG. 2 illustrates an embodiment of a gradient-based single wellbore ranging system in a relief wellbore operation.

Referring initially to FIGS. 1 and 2, a first wellbore 10 extends from a wellhead 11 into a formation 12 from the surface 13 of the formation. Disposed within wellbore 10 along at least a portion of its length is an elongated conductive member 14 which is generally oriented within wellbore 10 to be axially aligned therewith. Wellbore 10 may be cased or uncased. To the extent wellbore 10 is cased, in some embodiments, conductive member 14 may be a casing or liner disposed within wellbore 10. For either cased or uncased wellbores, in some embodiments, conductive member 14 may be a pipe string, tool string, tubing, electrical wire or other conductive body disposed in first wellbore 10. In any event, the intent is to provide a path for current flow along a substantial length of a reference wellbore, and any conduction path that serves this purpose can be used. Moreover, conductive member 14 is generally disposed within wellbore 10 to radiate a magnetic field radially outward from wellbore 10.

In some embodiments, first wellbore 10 may include a vertical section 16 and a directional section 18. The directional section 18 is drilled from the vertical section 16 along a desired azimuthal path and a desired inclination path.

With ongoing reference to FIGS. 1 and 2, there is shown a second wellbore 28 shown in the process of being drilled. A drilling system 30 is generally shown associated therewith. Drilling system 30 may include a drilling platform 32 positioned over formation 12, and a wellhead installation 34, including blowout preventers 36. Platform 32 may be disposed for raising and lowering a conveyance mechanism 48 within second wellbore 28.

Carried by conveyance mechanism 48 is an electric current injection system 50. Current injection system 50 includes a pair of electrodes, namely an emitter "E" electrode and a return "R". Attached adjacent the end of conveyance mechanism 48 is an electromagnetic (EM) sensor 51. In some embodiments, the electromagnetic sensor 51 can measure at least one component of the magnetic field or the gradient of the magnetic field. In some embodiments, the electromagnetic sensor 51 can measure at least one component of the electric field or the gradient of the electric field. EM sensor 51 includes at least a magnetic gradient sensor or magnetic gradiometer (receiver). In any event, in some preferred embodiments, current injection system 50 and EM sensor 51 are deployed together in an investigative wellbore, such as second wellbore 28. The current injection system 50 and EM sensor 51 together form a tool for EM ranging. These tool components may be packaged together as a single sub or they may be deployed separately along a pipe string.

To the extent drilling system 30 is being utilized to actively drill second wellbore 28, electric current injection system 50 and EM sensor 51 may be part of the bottom-hole-assembly (BHA) 52 of a drilling system. In such embodiments, conveyance mechanism 48 may be a tubing string or drill string, having a BHA 52 attached to the end of string 48. BHA 52 includes a drill bit 54. BHA may also include a power module 56, such as a mud motor, a steering module 58, a control module 60, and other sensors and instrumentation modules 62. As will be appreciated by persons of skill in the art, the BHA 52 illustrated in FIG. 1 may be a measurement-while-drilling or logging-while-drilling system in which passive ranging can be utilized to guide drill bit 54 while a drill string is deployed in wellbore 28.

Conveyance system 48 may be a cable such as a wireline, slickline or the like and used to lower current injection system 50 into wellbore 28. Power and communications to current injection system 50, if any, may be carried locally by appropriate modules 56-62 or may be transmitted via conveyance system 48.

The mud motor module 56 is driven by the drilling fluid flow, and in turn it drives the drill bit 54 to extend the second wellbore 28 along a desired path 32. Desired path 32 is shown as running parallel to the horizontal portion of wellbore 10 because in many cases, such as steam-assisted gravity drainage (SAGD) or coal bed degasification, it is desirable to drill a series of closely-spaced parallel wells. Mud motor module 56 may provide power to the current injection system 50 and/or the EM sensor 51.

Steering module 58 enables the wellbore 28 to be extended in a desired direction. Many suitable steering mechanisms are well known, e.g., steering vanes, "bent sub" assemblies, and rotary steerable systems. The steering mechanism configuration can be set and adjusted by commands from a control system 64 at the surface, such as a logging truck or other control skid. Alternatively, control module 60 can be programmed with a desired route, and it can adjust the steering mechanism as needed to direct the wellbore along the desired path.

While the current injection system 50 and EM sensor 51 as described herein are illustrated with respect to land-based drilling systems, the disclosure also includes use with offshore and marine drilling system.

Moreover, deployment of the current injection system 50 and EM sensor 51 is not limited to any particular orientation of the first and second wellbores. As depicted in FIG. 1, first and second wellbores 10, 28, respectively are substantially horizontal wellbores. In such case, current injection system 50 and EM sensor 51 may be particularly useful in ranging for SAGD operations. Alternatively, as depicted in FIG. 2, first and second wellbores 10, 28, respectively are substantially vertical wellbores. Thus, current injection system 50 and EM sensor 51 may be used in drilling relief wells or intersecting wells, such as when it is desirable to establish direct fluid communication between two wells. This may be particularly useful in wellbore killing operations, for example.

In any event, a control system 31 may also be deployed to control drilling system 30 based on EM ranging utilizing current injection system 50 and EM sensor 51.

With continuing reference to FIGS. 1-2, as well as FIG. 3, a wellbore ranging system 38 consists of two parts, both deployed together within an investigative wellbore: (i) a source of current, namely current injection system 50 (emitter E and return R electrodes) that injects alternating currents (AC) into formation 12 which currents travel to and then along conductive member 14 in first wellbore 10, and (ii) an EM sensor 51, namely a magnetic gradient sensor or magnetic gradiometer (receiver), that sense the gradient magnetic fields due to these AC currents on the conductive member 14. In certain embodiments, both current injection system 50 and EM sensor 51 are attached to, or a part of, a drill string 48 that also carries a drill bit 54 in second wellbore 28. In one or more embodiments, EM sensor 51 can be positioned proximate or adjacent drill bit 54. In any event, distance and direction to target can be calculated by analyzing the measured gradient magnetic fields.

FIGS. 3a-3g illustrate various embodiments of current injection system 50 and EM sensor 51. In the embodiments, EM sensor 51 is carried on the drill string 48 downhole of current injection system 30, and can be positioned proximate or adjacent drill bit 54. As show, each current injection system 50 utilizes a pair of electrodes, namely an emitter "E" electrode and a return "R" electrode disposed in wellbore 28 to control the path of current to and from the conductive member, thereby enhancing the generation of an EM field from conductive member 14 in first wellbore 10. The emitter electrode E and return electrode R may be deployed adjacent one another or spaced apart from one another. Preferably, electrodes E and R are in direct contact with the borehole fluid or the formation 12. Together with EM sensor 51, such an arrangement achieves a robust single wellbore ranging that is essential for the SAGD application. In addition to the emitter electrode E and return electrode R, embodiments of current injection system 50 may include one or more insulators or gap subs G deployed along the string to insulate one or more of the emitter electrode E, one or more of the return electrodes R and the EM sensor(s) 51. Moreover, the gap sub(s) G can be selected and positioned to control the path of current, such as illustrated by current lines 34, or otherwise drive the path current in a particular direction, in order to enhance the electromagnetic field, generally indicated at 36, emanating from the conductive member. As used herein, "gap sub" means an insulator such as a gap in conductive portions of a pipe string or an insulating portion of a pipe or an insulator sub or any other non-conductive device deployed to inhibit current flow along the drill string.

Figure 3A:
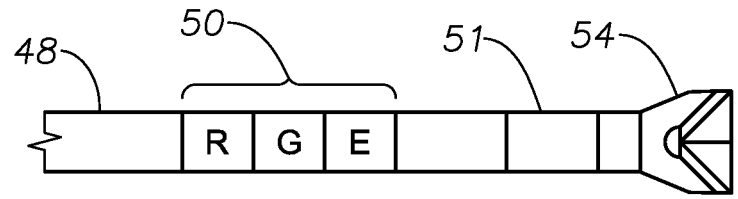
FIG. 3 illustrates multiple embodiments of source and insulator configurations for a gradient-based wellbore ranging system.

In FIG. 3a, an emitter electrode E is shown downhole of a return electrode R, but in close proximity thereto. In the embodiment, a first gap sub $G_1$ is deployed on the drill string 48 between emitter electrode E and return electrode R to ensure that current is not conducted from emitter electrode E to return electrode R by drill string 48. In this embodiment, current injection system 50 is spaced apart from the EM sensor 51, which is positioned proximate or adjacent drill bit 54.

Figure 3B:
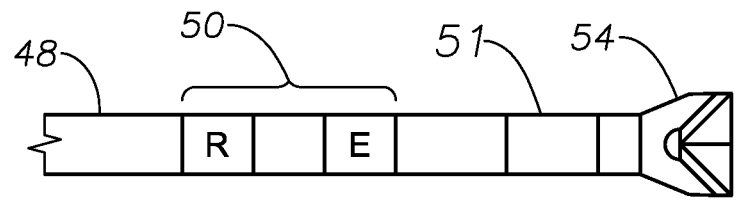

In FIG. 3b, an emitter electrode E is shown downhole of a return electrode R. In this embodiment, the return electrode is spaced apart from the emitter electrode to minimize direct transmission of the current by drill string 48. In this embodiment, current injection system 50 is likewise spaced apart from the EM sensor 51, which is positioned proximate or adjacent drill bit 54.

Figure 3C:
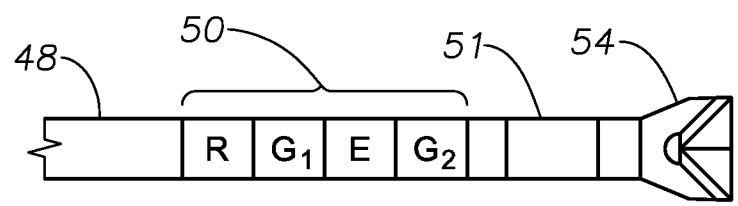

In FIG. 3c, an emitter electrode E is shown downhole of a return electrode R, but in close proximity thereto. In the embodiment, a first gap sub $G_1$ is deployed on the drill string 48 between emitter electrode E and return electrode R to ensure that current is not conducted from emitter electrode E to return electrode R by drill string 48. Likewise, a second gap sub $G_2$ is deployed on the drill string 48 between emitter electrode E and EM sensor 51, which is positioned proximate or adjacent drill bit 54. Gap sub $G_2$ ensures that current is not conducted from emitter electrode E to EM sensor 51 by drill string 48, thus minimizing EM fields from drill string 48 that could interfere with measurement by EM sensor 51 of EM fields from first wellbore 10. This embodiment permits EM sensor 51 to be positioned in closer proximity to current injection system 50.

Figure 3D:
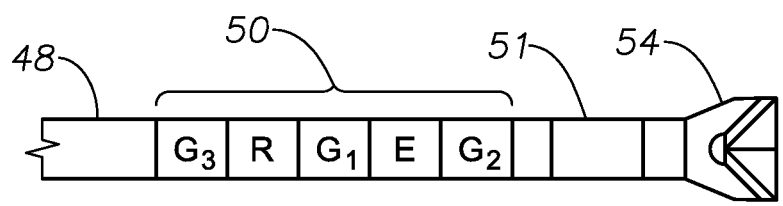

In FIG. 3d, an emitter electrode E is shown downhole of a return electrode R, but in close proximity thereto. In the embodiment, a first gap sub $G_1$ is deployed on the drill string 48 between emitter electrode E and return electrode R to ensure that current is not conducted from emitter electrode E to return electrode R by drill string 48. Likewise, a second gap sub $G_2$ is deployed on the drill string 48 between emitter electrode E and EM sensor 51, which is positioned proximate or adjacent drill bit 54. Gap sub $G_2$ ensures that current is not conducted from emitter electrode E to EM sensor 51 by drill string 48, thus minimizing EM fields from drill string 48 that could interfere with measurement by EM sensor 51 of EM fields from first wellbore 10. This embodiment permits EM sensor 51 to be positioned in closer proximity to current injection system 50. For example, EM sensor 51 may be spaced apart from emitter electrode E only a short distance given that gap sub $G_2$ is deployed there between. In addition, a third gap sub $G_3$ is positioned on drill string 48 upstream of return electrode R so as to drive currents traveling back from conductive member 14 through the formation 12 to return electrode R. This will result in a stronger or more concentrated EM field from conductive member 14.

Figure 3E:
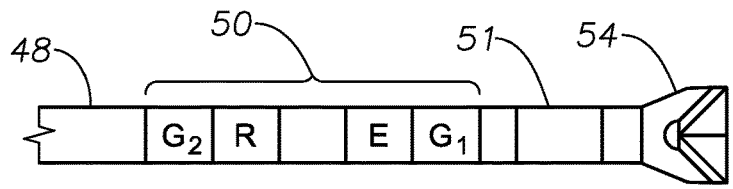

In FIG. 3e, an emitter electrode E is shown downhole of a return electrode R, but in close proximity thereto. In this embodiment, the return electrode is spaced apart from the emitter electrode to minimize direct transmission of the current by drill string 48. A gap sub $G_1$ is deployed on the drill string 48 between emitter electrode E and EM sensor 51, which is positioned proximate or adjacent drill bit 54. Gap sub $G_1$ ensures that current is not conducted from emitter electrode E to EM sensor 51 by drill string 48, thus minimizing EM fields from drill string 48 that could interfere with measurement by EM sensor 51 of EM fields from first wellbore 10. This embodiment permits EM sensor 51 to be positioned in closer proximity to current injection system 50. For example, EM sensor 51 may be spaced apart from emitter electrode E only a short distance given that gap sub $G_1$ is deployed there between. In addition, a gap sub $G_2$ is positioned on drill string 48 upstream of return electrode R so as to drive currents traveling back from conductive member 14 through the formation 12 to return electrode R. This will result in a stronger or more concentrated EM field from conductive member 14.

Figure 3F:
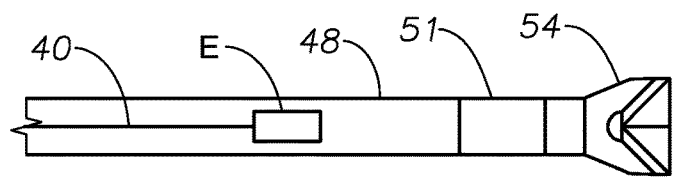

In FIG. 3f an emitter electrode E is carried by a wireline 40 that is deployed inside the drill string 48. In this embodiment, a return electrode R (not shown) is placed at the surface 13 (see FIG. 1). In this embodiment, current injection system 50, and in particular, emitter electrode E, is likewise spaced apart from the EM sensor 51, which is positioned adjacent drill bit 54.

Figure 3G:
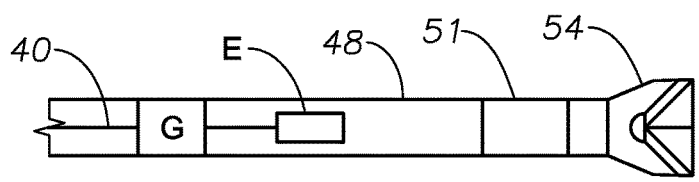

In FIG. 3g, similar to FIG. 3f, an emitter electrode E is carried by a wireline 40 that is deployed inside the drill string 48. In this embodiment, a return electrode R (not shown) is placed at the surface 13 (see FIG. 1). In this embodiment, current injection system 50, and in particular, emitter electrode E, is likewise spaced apart from the EM sensor 51, which is positioned adjacent drill bit 54. A gap sub G is deployed on the drill string 48 between emitter electrode E and the surface 13 (FIG. 1), where return electrode R is located. Gap sub G ensures that current is not conducted from emitter electrode E to return electrode R by drill string 48.

Although not shown, in the configurations of either FIG. 3f or 3g, a gap sub may also be positioned between the emitter electrode E and EM sensor 51. The gap sub so positioned ensures that current is not conducted from emitter electrode E to EM sensor 51 by drill string 48, thus minimizing EM fields from drill string 48 that could interfere with measurement by EM sensor 51 of EM fields from first wellbore 10. This embodiment permits EM sensor 51 to be positioned in closer proximity to current injection system 50.

While the system will be described primarily as having both the source (emitter E and return R) in the same wellbore as the magnetic gradient sensor, in other embodiments, the emitter E and return R may be positioned in the target wellbore, or at the surface or in another location other than the second wellbore.

In certain preferred embodiments, EM sensor 51 may include a magnetometer which may be used to measure an absolute magnetic field in order to obtain a general direction, thereby enhancing the magnetic gradient system disclosed herein. Alternatively, such a magnetometer may be separate from EM sensor 51. It is contemplated that a system measuring absolute magnetic field may be used to generally orient a drill string relative to the target wellbore. In contrast, the magnetic gradiometer of EM sensor 51, utilizing the magnetic gradient, is used to determine much more precise distances and respective positions of the two wellbores.

The current injection system 50 includes either a voltage controlled or current controlled transmitter 38, and it preferably alternates as very low frequencies in the order of 0.02-250 Hz to generate the current injected by emitter electrode E. Transmitter 38 may be locally carried on drill string 48, such as part of power module 56, or positioned at the surface with conductive wiring extending down to emitter electrode E, such as shown in FIG. 1.

As stated above, the magnetic gradient method and system generally will be described as having at emitter E and return R electrodes, along with a magnetic gradient sensor, on the same drill string in a second wellbore. However, the magnetic gradient method and system described herein are not limited to this arrangement. Thus, in certain embodiments, either the emitter E or return R electrodes, or both, may be located outside the second wellbore, such as for example, at the formation surface 13.

Notwithstanding the foregoing, in certain preferred embodiments, as illustrated in FIGS. 3a-3e, the emitter electrode E and return electrode R are carried by a drill string 48 in the second wellbore 28. Delivery of the current outside the drill string 48 can be achieved through a conducting arm or other apparatus carrying electrode E which is electrically connected to transmitter 38 (see FIG. 1).

In order to minimize direct return of the currents through the drill string 48 between the emitter electrode E and the return electrode R, and hence increase the portion of current that travels to conductive member 14, an insulator gap sub G can be placed between the emitter electrode E and the return electrode R (see FIGS. 3a, 3c and 3d).

Moreover, in order to minimize current flow from the emitter electrode E along the drill string 48 to magnetic gradiometer of EM sensor 51, which current could interfere with the performance of the magnetic gradiometer, a gap sub G may be disposed along the drill string 48 between the emitter electrode E and EM sensor 51 (see FIGS. 3c, 3d and 3e).

Likewise, to isolate a receiver electrode R so as to maximize current flow to receiver electrode R and prevent a large length of drill string 48 from receiving current (which degrades performance of the ranging system) a gap sub G may be disposed on one or both sides, i.e., uphole and downhole, of receiver electrode R (see FIGS. 3d and 3e).

Thus, in certain preferred embodiments, it is desirable to utilize at least two gap subs G along the drill string 48 in order to minimize transmission of current between locations on the drill string 48, such as between an emitter electrode E and a magnetic gradiometer of EM sensor 51, as well as to maximize current flow to a return electrode R.

Current on the conductive member 14 of first wellbore 10 can be maximized by increasing the spacing between the emitter electrode E and the return electrode R as they are positioned on drill string 48 (see FIGS. 3b and 3e). In these embodiments, conductive parts of drill string 48 may act as a source and they can increase the effective spacing of the electrodes, hence increasing the depth of penetration of the currents. Due to current leakage, current on the pipe eventually substantially leaves the pipe therefore limiting the length of the pipe that acts as a source. Preferably, in the foregoing embodiments, the size of the gap sub is chosen large enough to effectively achieve, however small enough not to compromise integrity and cost of the drill string.

If the emitter electrode E and return electrode R are spaced apart sufficiently, a gap sub between the emitter electrode E and return electrode R may be eliminated from the drill string 48. However, in such case, it is desirable to increase such separation so as to minimize transmission of the current along the drill string 48. For example, in some preferred embodiments, the emitter electrode E and return electrode R are spaced apart at least 200 feet (see FIGS. 3b and 3e).

In another embodiment illustrated in FIGS. 3(f) and 3(g), current is delivered from a wireline 40 that is deployed inside the drill string 48 with a return electrode R placed at the surface 13 (see FIG. 1). In both cases, currents 34 that leave the emitter electrode E travel through the formation 12 to the conductive member 14 (see FIG. 1). The current 34 then travels along the conductive member 14 generally along the z-axis. The current 34 then travels from the conductive member 14 back to the formation, and finally, the current 34 travels to the return electrode R completing the circuit.

If the emitter electrode E carried by wireline 40 is sufficiently spaced apart from the surface 13, the embodiment illustrated in FIG. 3(f) does not require a gap sub. However, for shallower applications or deployments where emitter electrode E is near the wellhead of second wellbore 48, a gap sub may increase amount of current delivered to conductive member 14, such as the gap sub G shown in FIG. 3(g).

In any case with respect to the embodiments illustrated in FIGS. 3(f) and 3(g), an additional gap sub may be deployed between the emitter electrode E and the EM sensor 51.

Figure 4:
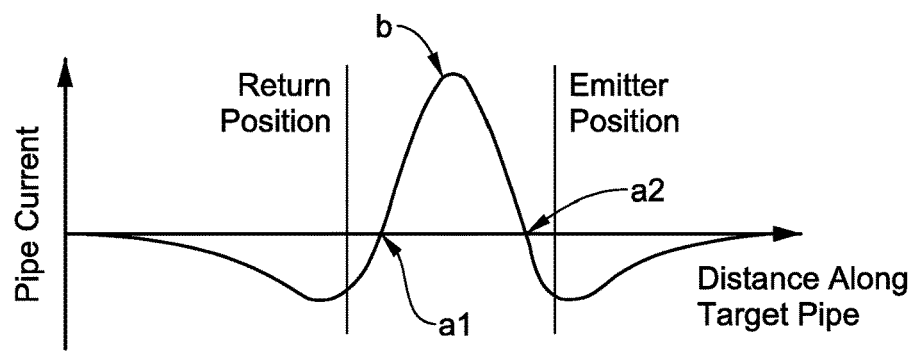
FIG. 4 illustrates a gradient-based measurement principle of a gradient-based wellbore ranging system.
Figure 5A:
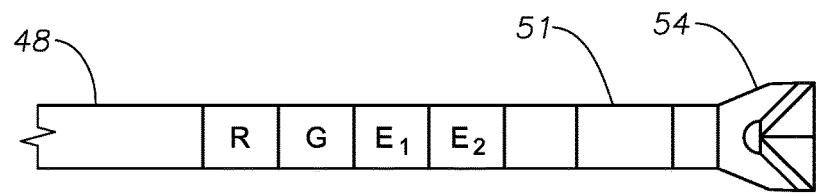
FIG. 5 illustrates an electrode array configuration for a gradient-based wellbore ranging system.
Figure 5B:
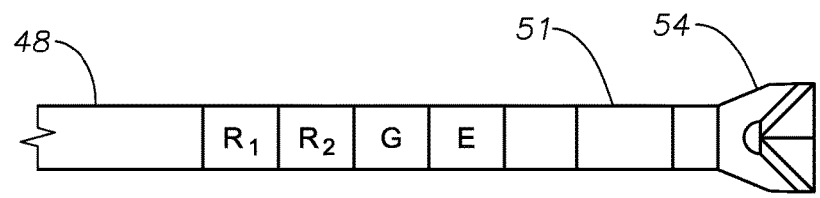

Placement of the emitter electrode E with respect to the return electrode R also has a considerable effect on the performance. In case where a single return electrode R and emitter electrode E are deployed, such as in the configuration shown in FIG. 3(a), current in the conductive member 14 exhibits two nulls (a1, a2), as illustrated in FIG. 4. The EM sensor 51 theoretically needs to be placed at or close to a maximum of the current distribution, illustrated at (b) in FIG. 4, to maximize ranging performance. However, even though the currents are maximized in between the emitter electrode E and the return electrode R, it is not advantageous to place the EM sensor 51 there since such sensors will be highly influenced by the direct coupling of the currents in the formation 12 and the drill string 48 between the emitter electrode E and the return electrode R. As a result, EM sensor 51 is placement ideally near the two maxima of the conductive member current magnitude (two minima in FIG. 3). Since exact distribution of currents on the drill string 48 and the conductive member 14 is not known, it is not always possible to use the optimum configuration. As a result, a compromise position generally needs to be chosen. It should be noted that an unexpected large variation in the conductive member current distribution may either (i) produce diminishing (null) effective currents in the vicinity of the EM sensor 51, or (ii) flipping of the current direction. The former can be alleviated by the use of a separate emitter electrode E or return electrode R as shown FIGS. 5a and 5b. In other words, by utilizing either two emitters electrodes $E_1$ and $E_2$ (as shown in FIG. 5a) or two return electrodes $R_1$ and $R_2$ (as shown in FIG. 5b), the nulls (a1, a2) demonstrated in FIG. 4 can be eliminated from affecting the overall data. As shown in FIGS. 5a and 5b, gap subs G may also be utilized in such configurations according to the discussion above.

Thus, in the case of three electrodes, two different distances between an emitter electrode E and a return electrode R can be chosen to ensure a large signal in all possible scenarios. As a non-liming example, in FIG. 5a, one emitter electrode $E_1$ can be chosen at a distance 3-10 feet away from the return electrode R, and the other emitter electrode $E_2$ can be chosen at a distance 5-20 feet away from the return electrode R. In the multiple return electrode R configuration of FIG. 5b, distance of the return electrodes $R_1$ and $R_2$ from the emitter electrode E can be chosen similarly.

Current reversal can be detected based on a comparison between the signs of the two emitter electrodes/return electrodes. For example, the emitter electrode E configuration with the shortest distance from the return electrode R is highly unlikely to suffer from sign reversal. As a result, sign of this measurement can be used to correct the sign of the measurement with the larger spacing. Moreover, it is also possible to compare signal levels to determine and correct if a sign reversal has occurred. In addition, past measurements can be used to detect and correct for sign reversals.

It should be noted that while the foregoing discussion of emitter electrodes E, return electrodes R and gap sub placement have been discussed primarily in relation to magnetic gradient sensors, persons of ordinary skill in the art will appreciate that the foregoing could be equally applied to, and used to improve, prior art systems that utilize magnetometers measuring absolute magnetic fields.

Determination of the distance and direction of the conductive member relative to the second wellbore is based on the magnetic fields received by one or more EM sensors. An EM sensor may be a magnetometer disposed to measure an absolute magnetic field or a receiver may be a magnetic gradient sensor (or magnetic gradiometer) disposed to measure magnetic field gradients.

In any event, determination of distance and direction is achieved by utilizing the relationship below between the conductive member and the magnetic field received by the EM sensor(s).

$$\overline{H} = \frac{I}{2\pi r}\hat{\phi} \qquad (1)$$

H is the magnetic field vector, I is the current on the conductive member, r is the shortest distance between the EM sensor(s) and the conductive member and φ is a vector that is perpendicular to both z axis of the EM sensor(s) and the shortest vector that connects the conductive member to the EM sensor(s). It should be noted that this simple relationship assumes constant conductive member current along the conductive member, however, persons of ordinary skill in the art will appreciate that the concept can be extended to any current distribution by using the appropriate model. It can be clearly seen that both distance and direction can be calculated by using this relationship.

$$r = \frac{I}{2\pi|\overline{H}|} \qquad (2)$$

$$\Phi = \text{angle}(\hat{x}\cdot\overline{H}, \hat{y}\cdot\overline{H}) + 90 \qquad (3)$$

where · is the vector inner-product operation. It has been observed by experience that Equation (3) is a reliable measurement of the relative direction of the conductive member with respect to EM sensor(s) coordinates and it can be used as long as signal received from the conductive member is substantially large compared to the measurement errors. However Equation (2) cannot be reliably used to calculate distance since a direct or accurate measurement of I does not exist. Specifically, it has been observed that any analytical calculation of I can be 50% off due to unknown conductive member characteristics. Furthermore, any in-situ calibration of I does not produce a system reliable enough to be used in the SAGD or wellbore intercept application due to variations in conductive member current due to changing formation resistivity and skin depth at different sections of a wellbore. As a result, the systems of the prior art that measure absolute magnetic field values are not suitable for SAGD or wellbore intercept applications.

To overcome these problems of the prior art, magnetic field gradient measurements are utilized, where spatial change in the magnetic field is measured in a direction that has a substantial component in the radial (r-axis) direction as below:

$$\frac{\partial \overline{H}}{\partial r} = -\frac{I}{2\pi r^2}\hat{\phi} \qquad (4)$$

where ∂ is the partial derivative. With this gradient measurement available in addition to an absolute measurement, it is possible to calculate the distance as follows:

$$r = \frac{|\overline{H}|}{\left|\frac{\partial \overline{H}}{\partial r}\right|} \qquad (5)$$

As such, Equation (5) does not require knowledge of the conductive member current I, if both absolute and gradient measurements are available. The direction measurement can still be made as shown in Equation (3).

In practical implementation it is not feasible to measure all components of the magnetic field which are required for making use of all of the above formulas. Instead a single component of the magnetic field that is oriented in direction u can be used. The magnetic field for such component can be written as:

$$\overline{H} \cdot \hat{u} = \frac{I}{2\pi r}(\hat{u} \cdot \hat{\phi}) \quad (6)$$

where hat sign indicates unit vectors and bar indicates vectors. Similarly, the u-component magnetic field gradient along v direction can be written as:

$$\frac{\partial \overline{H} \cdot \hat{u}}{\partial v} = \frac{\partial \frac{I}{2\pi r}\hat{\phi} \cdot \hat{u}}{\partial v} = \frac{I}{2\pi} \frac{\partial \frac{1}{r}\hat{\phi} \cdot \hat{u}}{\partial v} = \frac{I}{2\pi} \frac{\partial \frac{1}{r}\hat{\phi}}{\partial v} \cdot \hat{u} \quad (7)$$

$$= \frac{I}{2\pi}\left(\frac{\partial \frac{1}{r}}{\partial v}\hat{\phi} + \frac{1}{r}\frac{\partial \hat{\phi}}{\partial v}\right).$$

$$\hat{u} = \frac{I}{2\pi}\left(-(\hat{v} \cdot \hat{r})\frac{1}{r^2}\hat{\phi} - \frac{1}{r}(\hat{v} \cdot \hat{\phi})\frac{\hat{r}}{r}\right) \cdot \hat{u}$$

$$= -\frac{I}{2\pi r^2}\left((\hat{v} \cdot \hat{\phi})(\hat{u} \cdot \hat{r}) + (\hat{v} \cdot \hat{r})(\hat{u} \cdot \hat{\phi})\right)$$

With these absolute and gradient measurements available, distance to conductive member can be written as:

$$\frac{\overline{H} \cdot \hat{u}}{\frac{\partial \overline{H} \cdot \hat{u}}{\partial v}} = -r\frac{(\hat{u}, \hat{\phi})}{((\hat{v} \cdot \hat{\phi})(\hat{u} \cdot \hat{r}) + (\hat{v} \cdot \hat{r})(\hat{u} \cdot \hat{\phi}))}$$

where $$\hat{r} = \hat{x}\cos(\Phi) + \hat{y}\sin(\Phi)$$

$$\hat{\phi} = -\hat{x}\sin(\Phi) + \hat{y}\cos(\Phi) \quad (9)$$

In an example case, where $H_y$ component is measured along x, Equation (7-9) can be combined as following:

$$\frac{H}{\frac{\partial H_y}{\partial x}} = r\frac{\cos(\Phi)}{(\sin(\Phi)^2 - \cos(\Phi)^2)} \quad (10)$$

Finally distance can be written as:

$$r = \frac{H_y}{\frac{\partial H_y}{\partial x}}\frac{(\sin(\Phi)^2 - \cos(\Phi)^2)}{\cos(\Phi)} \quad (11)$$

The gradient field in Equation (11) is realized in practice by utilizing finite difference of two magnetic field dipole measurements as shown below:

$$r = \frac{H_y}{\frac{H_y\left(x + \frac{\Delta x}{2}, y\right) - H_y\left(x - \frac{\Delta x}{2}, y\right)}{\Delta x}}\frac{(\sin(\Phi)^2 - \cos(\Phi)^2)}{\cos(\Phi)} \quad (12)$$

Figure 6:
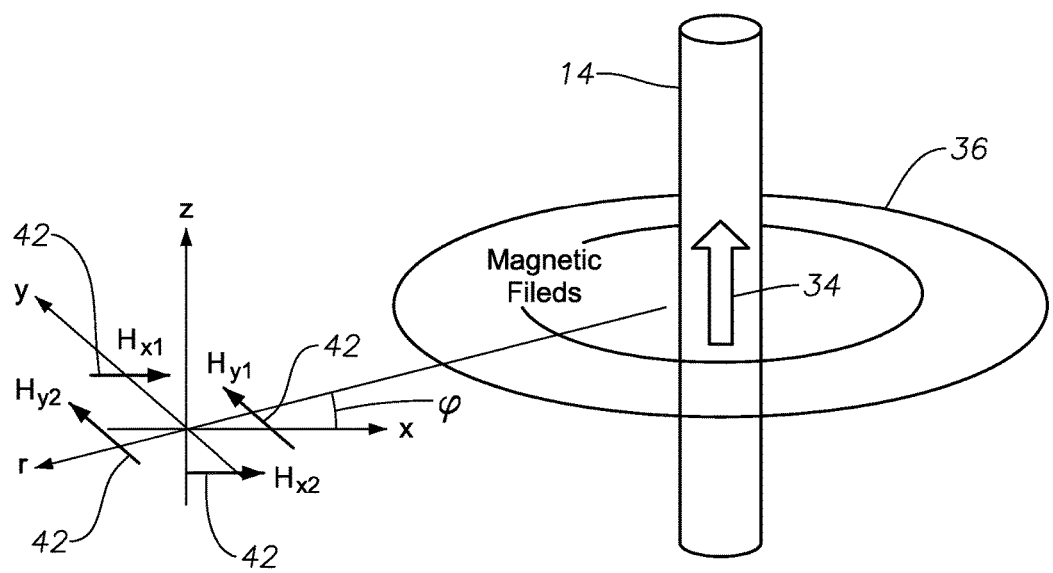
FIG. 6 illustrates the magnetic gradient-based measurement principle of a gradient-based wellbore ranging system.

Utilizing these principles, FIG. 6 illustrates of one possible EM sensor 51 that could be utilized in certain embodiments. Specifically illustrated is a magnetic field gradient sensor 51 configuration having 4-dipoles ($H_{x1}$, $H_{x2}$, $H_{y1}$, $H_{y2}$) arranged about a primary axis Z and shown in relation to a conductive member 14 and the magnetic fields 36 produced by the currents 34 on the conductive member. The dipoles $H_{x1}$, $H_{x2}$, $H_{y1}$, $H_{y2}$ as shown are arranged at 90° from one another about a primary axis Z. As used herein, dipole means an antenna or electrode formed of elongated coil of wire disposed along a dipole axis and having a multiplicity of turns of wire about a core as is well known in the art. The arrows 42 generally indicate the direction of the core and windings of each dipole.

Persons of ordinary skill in art will understand, however, that as can be seen from Equation (10), gradient measurement with a single component becomes unstable due to singularity of the denominator every 90° starting from 45°. As a result, gradient measurement with a single component is only sensitive to angles 90°×k, where k is an integer. This would apply to FIG. 6 as well, where 4 dipoles arranged at 90° from one another are used to calculate the magnetic fields.

In embodiments that measure both absolute magnetic fields and gradient magnetic fields, it should be noted that the EM sensor preferably has a minimum of 3 dipoles H for achieving gradient measurement, namely 2 dipoles for gradient plus 1 dipole for absolute electromagnetic field magnitude measurement. An example would be three dipoles H arranged in a triangle in the EM sensor about a primary axis Z to eliminate blind spots as discussed below. However, because symmetric dipole arrangements are easier to engineer and manufacture, such a three dipole arrangement may be less desirable than symmetric dipole arrangement in some cases.

Figure 7A:
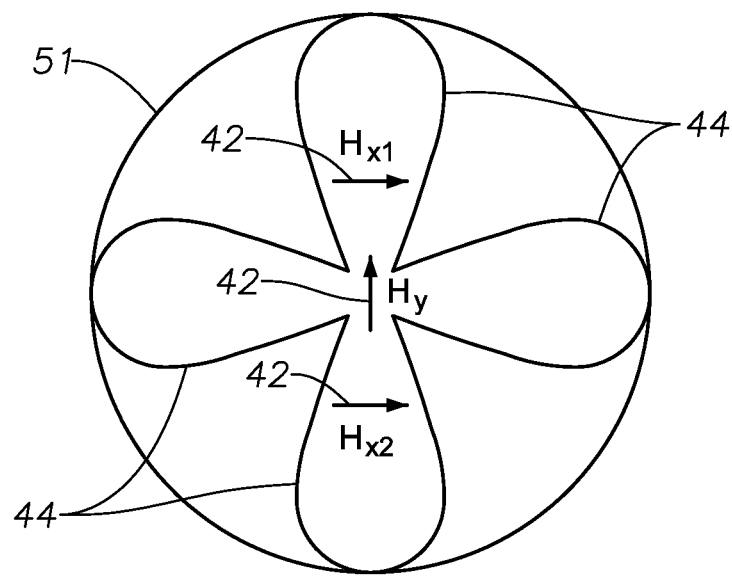
FIG. 7 illustrates 3-, 4- and 8-dipole arrangements for a gradient-based wellbore ranging system.
Figure 7B:
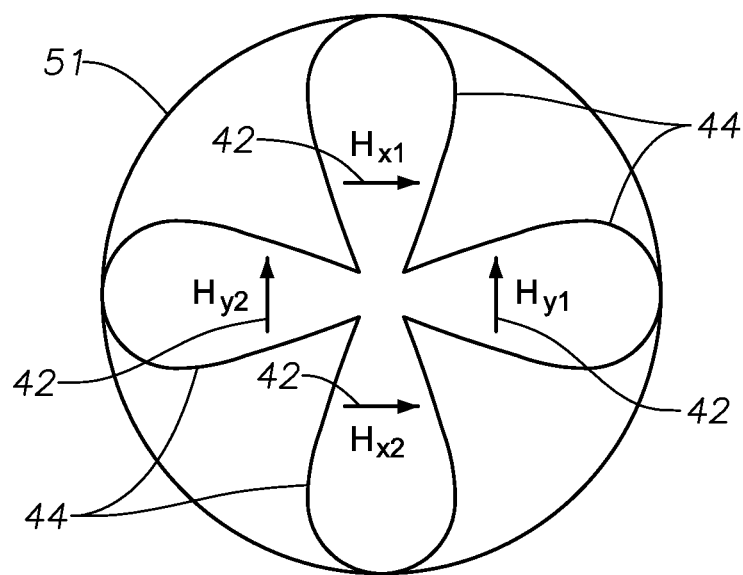
Figure 7C:
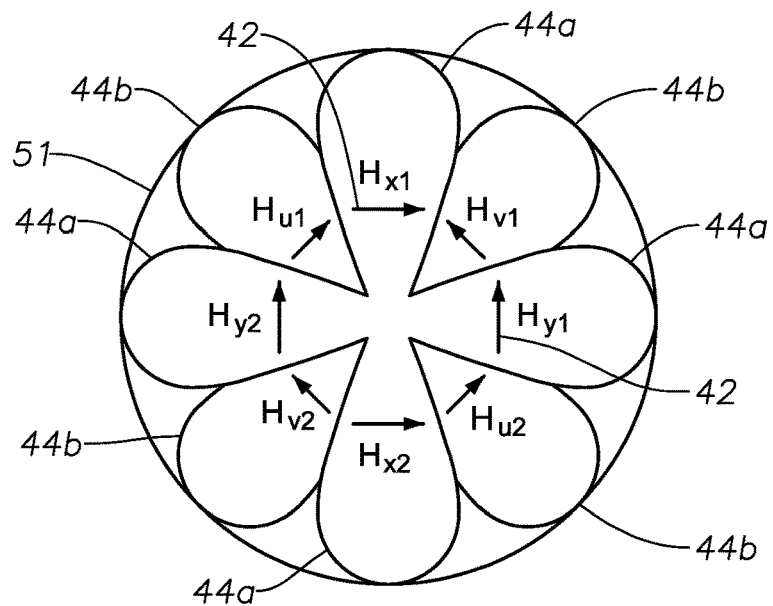

FIG. 7a illustrates a 3-dipole EM sensor having dipoles $H_{x1}$, $H_{x2}$, and $H_y$. The arrows 42 generally indicate the direction of the core and windings of each dipole. FIG. 7b illustrates a 4-dipole EM sensor having dipoles $H_{x1}$, $H_{x2}$, $H_{y1}$, $H_{y2}$. FIG. 6c illustrates an 8-dipole EM sensor having dipoles $H_{x1}$, $H_{x2}$, $H_{y1}$, $H_{y2}$, $H_{u1}$, $H_{u2}$, $H_{v1}$, $H_{v2}$ that could be utilized in certain embodiments. With respect to each of FIGS. 7a, 7b and 7c, the directionality of sensitivity of the measurement is indicated in each case by lobes 44. As can be seen, 3- and 4-dipole devices can make good measurement of gradient field only in directions that are in the vicinity of 0°, 90°, 180° and 270°, resulting in blind spots in the magnetic gradient field data. One solution to this problem is to use dipoles and gradient measurements in more directions, as shown in FIG. 7c. In this case, 4 of the dipoles cover 0°, 90°, 180° and 270° as illustrated by lobes 44a, while the other 4 dipoles cover 45°, 135°, 225° and 315° as illustrated by lobes 44b. It should be noted that coverage similar to the configuration shown in FIG. 7c could be achieved with a total of 6 dipoles H without significantly impacting accuracy; however additional information provided by the extra dipoles H can be used for different purposes such as quality control and having engineering advantages of a symmetric sensor array.

Figure 7D:
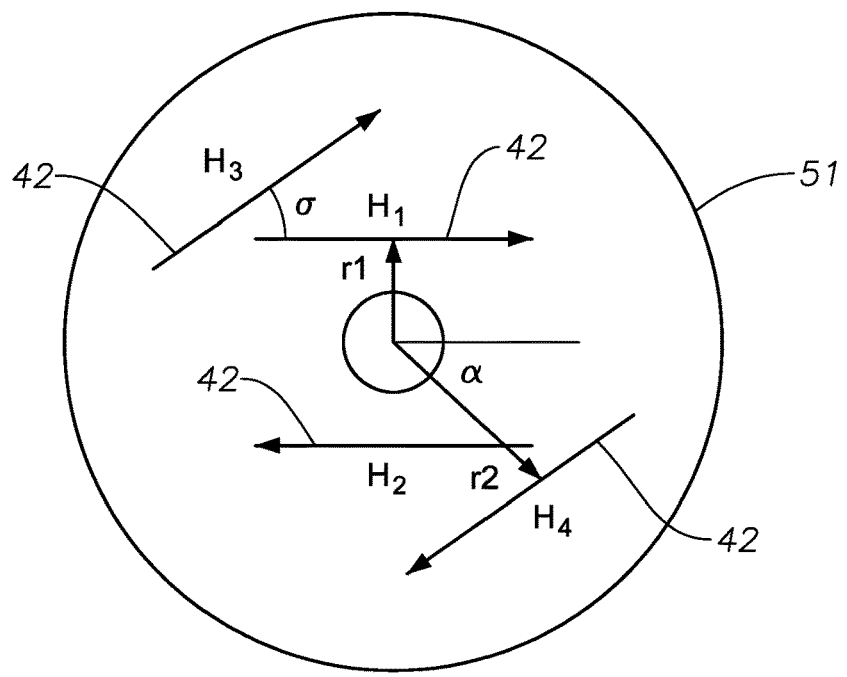

In another embodiment of an EM sensor, shown in FIG. 7d, two pairs of dipoles ($H_1$, $H_2$ and $H_3$, $H_4$) are spaced apart and arranged so as to be at an angle to one another. The radial angle α around a central axis and/or the relative angle σ between pairs of dipoles may be adjusted between 0-89°, and preferably approximately 45°, to minimize or eliminate blind spot area, depending on the size and properties of the particular dipoles. The pairs of dipoles ($H_1$, $H_2$ and $H_3$, $H_4$)

may also be positioned at different radii, r1 and r2 about the axis. For example, each dipole coil may be preferably about 0.1 meters long and have approximately 100,000 turns of wire. Each coil is preferably connected to circuitry which includes a low noise, high gain, band pass amplifier. The amplifier voltages are fed individually into a downhole microprocessor for analysis. Persons of ordinary skill in the art will appreciate that because of the expense of the sensors, as well as the limited space downhole for any unnecessary components, elimination of any number of dipoles while minimizing blind spots is desirable.

EM sensor magnetic dipoles can be realized with magnetometers, atomic magnetometers, flux-gate magnetometers, magnetic gradiometers, solenoids or coils. It should be noted here that gradient measurement can also be conducted by electrically connecting two magnetic dipoles in different orientations and making a single measurement, as opposed to subtracting values of two separate magnetic field measurements. The processing methodologies described above can be generalized to such case.

Finally, in prior art systems that measure absolute magnetic field, in order to obtain the best results, it is necessary to position a magnetometer adjacent a drill bit. While some embodiments disclosed herein illustrated the EM sensor as being disposed downhole adjacent a drill bit, use of magnetic gradient as opposed to absolute magnetic field in certain embodiments minimizes the effects of the location of the EM sensor along the drill string. Thus, by utilizing magnetic gradient in the practice of certain embodiments, it is possible to position the EM sensor spaced apart from the drill bit. In some embodiment, the EM sensor is positioned between the emitter electrode E and return electrode R, while in other embodiments, the EM sensor is positioned along the drill string above both the emitter electrode E and the return electrode R. In all cases, gap subs are utilized between the EM sensor and the electrodes to isolate the EM sensor from the electrodes as discussed above.

As stated above, the absolute magnetic field magnitude measurement utilized in the prior art is undesirable because the accuracy of such measurements can be affected by many different variables, such as skin effect, condition of conductive member, i.e., usually, the first wellbore casing, profile of conductive member, etc. For example, relevant characteristics of the first wellbore casing such as conductivity and magnetic permeability are known to show large variations between different casing sections, and also can change in time due to effects such as mechanical stress, temperature and corrosion. Since distribution of current on the first wellbore casing depends on the skin depth and hence resistance per pipe length, it is not possible to make an accurate analytical estimation about the current excited on the first wellbore casing due to the source. Furthermore, variations along different casing sections also make it very difficult to calibrate current in one section of the casing based on another section.

Figure 8:
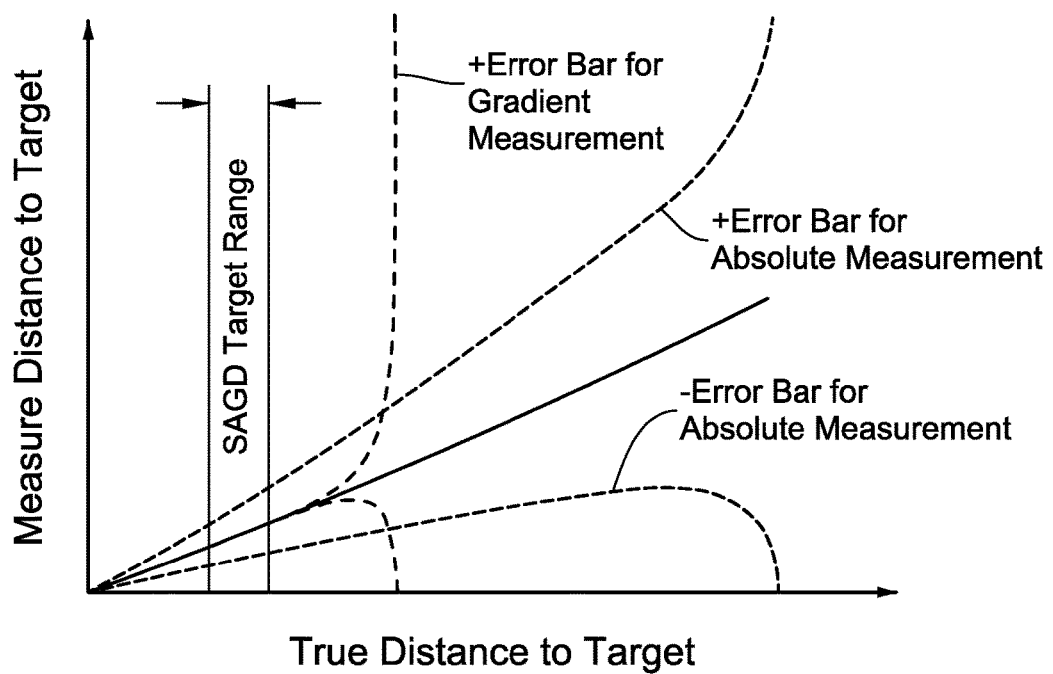
FIG. 8 is a graph illustrating the uncertainty in absolute measurement vs. gradient measurement of magnetic fields.

As illustrated in FIG. 8, it has been observed that distance from absolute measurement magnitude can detect presence of the first wellbore or "target" from farther away, however it has a very large cone of uncertainty associated with it. Gradient measurement, on the other hand, can detect the target at shorter distances; however, it has a much smaller cone of uncertainty. The requirements for use of the ranging methods disclosed herein for SAGD and wellbore intercept applications fall inside the gradient measurement capability range and as a result, the methods and systems disclosed herein have a clear advantage when compared to prior art systems and methods based on absolute measurement.

Figure 9:
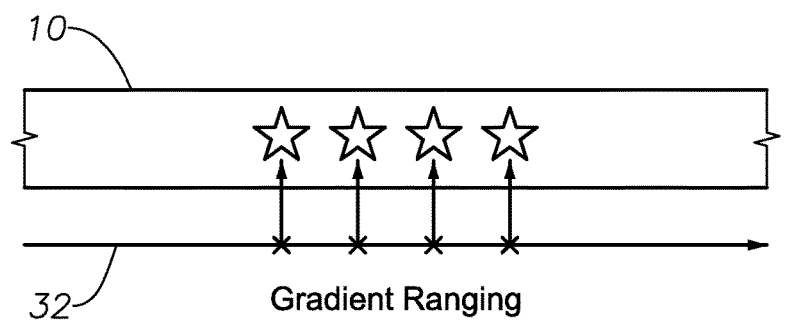
FIG. 9 illustrates a method to measure distance using a gradient-based wellbore ranging system.

With reference to FIG. 9, in the prior art ranging and directional drilling methods, it is known to use multiple absolute direction measurements from the wellbore being drilled at different angles to the target wellbore through triangulation techniques to determine a range. This requires the trajectory of the wellbore being drilled to be a spiral, S-shape, or curving relative to the target wellbore, a trajectory that would be undesirable for SAGD applications. Furthermore, such a triangulation approach averages information over long distances and reduces the geosteering response time. In contrast, as illustrated in FIG. 8, use of the gradient ranging methods as disclosed herein permits the trajectory of the second wellbore to be substantially parallel to the target wellbore, in a linear path, which is much more desirable for SAGD operations. Furthermore since independent information can be available at each point, geosteering can respond to deviations in distances more quickly than the prior art methods.

Moreover, in the prior art, as described above, in order to maximize steering performance, especially when driven in a spiral or S-shaped path, magnetometers are typically positioned in the drill string as close as possible to the drill bit, preferably next to it. In the embodiments disclosed herein, as used for SAGD applications, the drill string is substantially parallel to the target wellbore, so placement of the EM sensor(s) is less important in terms of steering performance. It is also possible to place the EM sensor(s) elsewhere on the drill string, such as in the bit.

Figure 10:
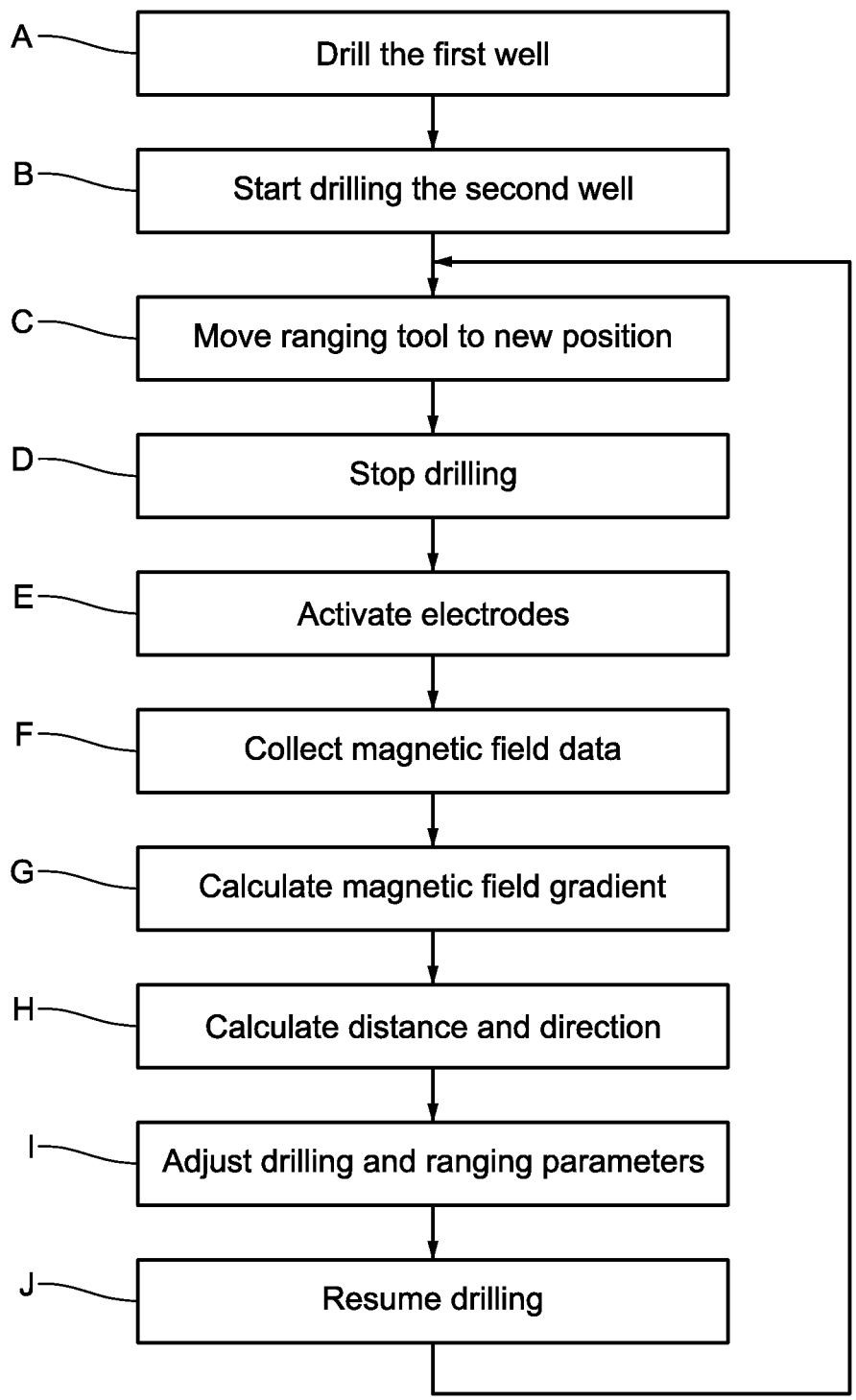
FIG. 10 is a flow chart of a ranging method of a gradient-based wellbore ranging system utilizing magnetic field gradient.

FIG. 10 illustrates the steps of implementation of some embodiments of a magnetic gradient ranging system as disclosed herein to range between first and second wellbores. In step A, a first wellbore is drilled. Once drilled, a conductive member is positioned in a portion of the first wellbore, namely the portion from which it is desired to range from the second wellbore. The conductive member may be wellbore casing or some other conductive member. The first wellbore can be either the injector or producer wellbore to the extent the ranging is utilized in SAGD operations. Traditionally the producer wellbore is drilled first since it has to be placed in the reservoir at the optimum position to yield maximum amount of hydrocarbons. However, for purposes of the ranging method as disclosed herein, either wellbore could be drilled first. In wellbore intercept operations, the first wellbore may be the wellbore that is to be killed. In certain embodiments of this step, a wellbore placement tool such as azimuthal propagation resistivity tools or an ultra-deep reading resistivity tool may be used to place the first wellbore. Such tools are commonly used to position a producer wellbore at optimal distances from the adjacent layers in the reservoir. Moreover, survey data can be collected in the drilling of this first wellbore to aid the guiding of the second wellbore.

In step B, drilling of the second wellbore is started. In a preferred embodiment, the build section, i.e., the section of the second wellbore that is to be placed relative to the first wellbore, is guided either with survey information or absolute or gradient information from the ranging tool described in the following steps.

After the build section has begun, a ranging procedure to keep the second wellbore at a desired trajectory relative to the first wellbore is initiated. For SAGD operations, the trajectory would be parallel and at desired distance to the first wellbore. The ranging procedure utilizes a ranging system having one or more emitter electrodes E, one or more return electrodes R and an EM sensor as described above. The emitter electrode E and EM sensor are positioned in the second wellbore, preferably as part of the drill string being utilized to drill the second wellbore. In some embodiments, the return electrode R is also positioned in the second wellbore. A current generator deployed either on the drill string or at the surface provides a current to the emitter electrode E. Some embodiments may include one or more gap subs to isolate one or more the electrodes and EM sensor(s) from currents traveling along the drill string.

Once the ranging system, i.e. the emitter electrode E, the return electrode R, the EM sensor(s) and any gap subs, is in position as at step C, a the wellbore ranging method is employed. In certain embodiments, the method may include the use of magnetic gradients as described above. It should be noted here that the disclosed system can be utilized to maintain substantially the same distance between the first and second wellbores, or drilling orientation of the second wellbore can follow a prescribed or controlled varying distance based on local characteristics of the formations, such as in the case of wellbore intercept procedures.

It is preferable, as at step D, to interrupt drilling during wellbore ranging in order to minimize noise levels that could interfere with ranging measurements. The time between the drilling stop and ranging start can be optimized to reduce noise due to wobbling and also minimize idle time. Similarly, duration of ranging can be optimized to reject electrical system and magnetic environment noise and also minimize idle time.

In step E, electrodes of the ranging system are activated to inject current in order to generate a magnetic field from the first wellbore, namely the wellbore containing the conductive member. Current injection can be either automatic, after a predetermined distance along the second wellbore trajectory has been drilled, a predetermined time period has lapsed or base on some other criteria, or current injection can be manual. In some preferred embodiments, the current is injected from the second wellbore utilizing an emitter electrode disposed therein. In some embodiments, the emitter electrode is carried on the drill string utilized to drill the second wellbore, while in other embodiments, both the emitter electrode and return electrode are carried on the drill string. The emitter electrode may be isolated from other components of the ranging system utilizing gap subs. In other embodiments, current may be injected into the formation at the surface or current may be injected by direct electrical contact with the conductive body in the first wellbore.

In any event, the injected current is driven to the first wellbore from the emitter electrode. As mentioned above, gap subs may be deployed in the second wellbore to guide current towards the first wellbore (as opposed to allowing current to be transmitted along the drill string). Likewise, placement of the return electrode may be selected to enhance a current path to the first wellbore. Thus, in embodiments, where the return electrode is in the second wellbore, the return electrode's position may be selected relative to the emitter electrode based on a desired result. In this regard, it may be spaced apart a distance along the drill string to enhance the electromagnetic field emanating from the first wellbore. In summary, the emitter electrode and return electrode, their spacing and their isolation is selected in order to drive the current to the conductive member in the first wellbore and enhance the electromagnetic field emanating therefrom.

With an electromagnetic field emanating from the first wellbore, the EM sensor is activated. The EM sensor may be activated manually from the surface or automatically. For example, in some embodiments, a controller module carried by the BHA in the second wellbore may include an algorithm that detects currents and activates the EM sensor(s). Specifically, in step F, although the EM sensor(s) may be any number of devices suitable for measuring magnetic fields, in some embodiments, the EM sensor comprises a set of magnetic dipole antennas that detect electromagnetic field signals generated therein which electromagnetic field signals arise from the currents driven to travel along a length of the first wellbore. The electromagnetic field signals may be recorded and processed locally or may be transmitted to the surface for recording and/or processing. In some preferred embodiments, as illustrated in FIG. 8, at least two magnetic field signals representing at least two different locations of magnetic fields are recorded. This may be accomplished utilizing multiple dipole antennas spaced apart from one another. The data that is collected by the dipole antennas may be in the form of magnetic field, electric field, voltage or current. In order to perform signal to noise analysis, it is advantageous to analyze the data in magnetic field units.

In step G, the magnetic field data collected in step F is used to calculate a range. In some embodiments, the range may be based on magnetic field gradient. For example, the magnetic field gradient may be calculated as described in Equations (1)-(12) above.

In step H, the distance and direction between the first and second wellbores is determined Since the direction and distance results are based on the EM sensor's coordinate system, the EM sensor's coordinate system must be transformed in order to convert it to earth or other coordinate system that can be used in geosteering. Earth's magnetic field or gravity information may be used to measure receiver orientation and achieve the transformation described above.

In step I, the computed distance and direction are used to adjust the drilling parameters for the second wellbore, such as the trajectory of the wellbore path, after which, in step J, a geo steering system carried by the drill string may be accordingly adjusted in order to steer the drill bit based on the magnetic ranging and drilling resumes. The ranging procedure described in steps C-J is preferably performed at select depth intervals that optimize both geosteering performance and rig time. Apriori information can be used to adjust the time interval between successive rangings. For example, if the survey data of the first wellbore indicates that the wellbore is expected to be substantially horizontal, the interval between ranging measurements can be extended. If the wellbore is expected to have dog-legs, ranging measurements can be performed more frequently. Near the end of a wellbore, currents travelling along a conductive member disposed therein behave differently compared to other sections of the conductive member since the flow path of current is modified. In order to avoid adverse effects, in some embodiments, the first wellbore can be drilled longer than the second wellbore. Based on the scenario, it is possible to switch to different processing techniques. As an example, if the second wellbore needs to locally follow a path that is far from the first wellbore, ranging based on the absolute value can be used locally.

Thus, a wellbore ranging tool for electromagnetic ranging between first and second wellbores has been described. The tool is characterized by an elongated axis. Embodiments of the wellbore ranging tool may generally include an electric current source; at least two electrodes disposed along the tool axis, where at least one electrode is an emitter electrode and at least one electrode is a return electrode, wherein the electric current source is electrically connected to the emitter electrode; and a magnetic gradiometer disposed along the tool axis, configured to detect a magnetic gradient induced by a current flowing in a conductive member in a one of the wellbores. Likewise, a wellbore ranging system has been described. Embodiments of the wellbore ranging system may generally include a first wellbore having an elongated conductive member disposed therein; a second wellbore having a pipe string disposed therein; an electric current source; at least two electrodes disposed along the pipe string, where at least one electrode is an emitter electrode and at least one electrode is a return electrode, wherein the electric current source is electrically connected to the emitter electrode; and a magnetic gradiometer disposed along the pipe string, configured to detect a magnetic gradient induced by a current flowing in a conductive member in a one of the wellbores. The system may incorporate the wellbore ranging tool, alone or in combination with one or more methods described herein. Moreover, any one of the following elements, alone or in combination with each other, may be combined with any of the foregoing embodiments:

The emitter and return electrodes are spaced apart from each other along the tool axis.

At least three electrodes and at least two insulators, wherein the at least three electrodes are electrically isolated from one another along the tool by the at least two insulators.

The emitter and return electrodes are separated by at least one insulator.

The magnetic gradiometer is separated from the electrodes by at least one insulator.

A third electrode, wherein the third electrode is an emitter electrode spaced apart from the other emitter electrode.

A third electrode, wherein the third electrode is a return electrode spaced apart from the other return electrode.

A tubing string along which the electrodes and magnetic gradiometer are positioned.

The magnetic gradiometer comprises at least three dipoles arranged radially spaced apart from one another about the tool axis.

The magnetic gradiometer comprises at least four dipoles arranged radially spaced apart from one another about the tool axis.

The magnetic gradiometer comprises at least six dipoles arranged radially spaced apart from one another about the tool axis.

The magnetic gradiometer comprises at least eight dipoles arranged radially spaced apart from one another about the tool axis.

The magnetic gradiometer comprises:
  a first pair of dipoles symmetrically arranged around a central axis and spaced apart from one another; and
  a second pair of dipoles arranged around the central axis and spaced apart from one another, wherein the second pair of electrodes are rotated about the central axis at a radial angle of between 0-89° relative to the first pair of electrodes.

A first pair of dipoles are disposed at a first diameter around a central axis and a second pair of dipoles are disposed at a second diameter, different than the first diameter, about the central axis.

The magnetic gradiometer comprises a first pair of dipoles symmetrically arranged around a central axis and spaced apart from one another; and a second pair of dipoles arranged around the central axis and spaced apart from one another, wherein a relative angle of between 0-89° is formed between the first and second pair of electrodes.

A second pair of dipoles are rotated about a central axis at a radial angle of between 0-89° relative to a first pair of dipoles.

A first pair of dipoles is disposed at a first diameter around a central axis and a second pair of dipoles is disposed at a second diameter, different than the first diameter, about the central axis.

A first insulator and a second insulator disposed along the tool axis, wherein the emitter electrode is separated from the return by the first insulator and one of the emitter or receiver electrodes is separated from the magnetic gradiometer by the second insulator.

A third electrode and a third insulator disposed along the tool axis, wherein the third electrode is electrically isolated from the other electrodes by the third insulator.

An insulator disposed between the emitter electrode and the magnetic gradiometer, insulating the magnetic gradiometer from current flow from the emitter electrode along the tool; and an insulator disposed between the emitter and the return electrodes, insulating the return electrode from current flow from the emitter electrode along the tool.

The magnetic gradiometer is disposed along the axis of the tool between the emitter electrode and the return electrode.

An insulator disposed between the emitter electrode and the magnetic gradiometer, insulating the magnetic gradiometer from current flow from the emitter electrode along the tool; and an insulator disposed between the return electrode and the magnetic gradiometer, insulating the magnetic gradiometer from current flow from the return electrode along the tool.

A first insulator disposed along the axis between the emitter and the return electrodes, insulating the return electrode from current flow from the emitter electrode along the tool; and a second insulator disposed along the axis on the opposite side of the return electrode from first insulator.

The magnetic gradiometer is disposed along the axis of the tool between the emitter electrode and the return electrode.

An insulator disposed between the emitter electrode and the magnetic gradiometer, insulating the magnetic gradiometer from current flow from the emitter electrode along the tool.

An insulator disposed between the emitter electrode and the magnetic gradiometer along the pipe string, insulating the magnetic gradiometer from current flow from the emitter electrode along the pipe string.

An insulator disposed between the emitter electrode and the return electrode along the pipe string, insulating the return electrode from current flow from the emitter electrode along the pipe string.

An insulator disposed along the pipe string between the emitter electrode and the magnetic gradiometer, insulating the magnetic gradiometer from current flow from the emitter electrode along the pipe string; and an insulator disposed along the pipe string between the emitter and the return electrodes, insulating the return electrode from current flow from the emitter electrode along the pipe string.

The magnetic gradiometer is disposed along the pipe string between the emitter electrode and the return electrode.

A drill bit and a steerable system carried by the pipe string

The electric current source is a power generation module carried by the pipe string.

Thus, a wellbore ranging method has been described. Embodiments of the wellbore ranging method may generally include drilling a first wellbore and positioning an elongated conductive member within a portion of the first wellbore; commencing the drilling of a second wellbore; positioning a return electrode along a pipe string in the second wellbore; positioning an emitter electrode along a pipe string in the second wellbore and electrically insulating the emitter electrode from the return electrode on the pipe string; activating an alternating current and delivering the alternating current to the emitter electrode; utilizing the emitter electrode to generate a magnetic field from the first wellbore; and measuring a magnetic gradient from the second wellbore based on the magnetic field. For any of the foregoing embodiments, the method may include any one of the following, alone or in combination with each other:

Positioning a gap sub along the pipe string between the emitter electrode and the return electrode.

Positioning a gap sub along the pipe string between the emitter electrode and an EM sensor utilized to measure magnetic gradient.

Positioning along the pipe string an EM sensor utilized to measure magnetic gradient between the return electrode and the emitter electrode.

Positioning a gap sub along the pipe string between the emitter electrode and an EM sensor and positioning a gap sub along the pipe string between the return electrode and an EM sensor.

Transmitting current to the emitter electrode.

Collecting magnetic field data, calculating a magnetic field gradient, and calculating a distance and direction between the first and second wells based on the magnetic field gradient.

Utilizing the ranging method to conduct SAGD operations.

Utilizing the ranging method to conduct wellbore intercept operations.

It should be understood by those skilled in the art that the illustrative embodiments described herein are not intended to be construed in a limiting sense. Various modifications and combinations of the illustrative embodiments as well as other embodiments will be apparent to persons skilled in the art upon reference to this disclosure. It is, therefore, intended that the appended claims encompass any such modifications or embodiments.

The invention claimed is:

1. A wellbore ranging system for electromagnetic ranging between first and second wellbores, the system comprising:
a drill string or tubing string coupled to a bottom hole assembly (BHA) comprising:
an electric current source removably affixed to the BHA;
at least two electrodes removably affixed along the BHA axis, where at least one electrode is an emitter electrode and at least one electrode is a return electrode, wherein the electric current source is electrically connected to the emitter electrode; and
a magnetic gradiometer removably affixed along the BHA axis, configured to detect a magnetic gradient induced by a current flowing in a conductive member in one of the wellbores.

2. The system of claim 1, wherein the emitter and return electrodes are spaced apart from each other along the BHA axis.

3. The system of claim 1, further comprising at least three electrodes and at least two insulators, wherein the at least three electrodes are electrically isolated from one another along the BHA by the at least two insulators.

4. The system of claim 1, wherein the emitter and return electrodes are separated by at least one insulator.

5. The system of claim 1, wherein the magnetic gradiometer is separated from the electrodes by at least one insulator.

6. The system of claim 1, further comprising a third electrode, wherein the third electrode is an emitter electrode spaced apart from the other emitter electrode.

7. The system of claim 1, further comprising a third electrode, wherein the third electrode is a return electrode spaced apart from the other return electrode.

8. The system of claim 1, wherein the magnetic gradiometer comprises at least three dipoles arranged radially spaced apart from one another about the BHA axis.

9. The system of claim 1, wherein the magnetic gradiometer comprises at least four dipoles arranged radially spaced apart from one another about the BHA axis.

10. The system of claim 1, wherein the magnetic gradiometer comprises at least six dipoles arranged radially spaced apart from one another about the BHA axis.

11. The system of claim 1, wherein the magnetic gradiometer comprises at least eight dipoles arranged radially spaced apart from one another about the BHA axis.

12. The system of claim 1, wherein the magnetic gradiometer comprises:
a first pair of dipoles symmetrically arranged around a central axis and spaced apart from one another; and
a second pair of dipoles arranged around the central axis and spaced apart from one another, wherein the second pair of electrodes are rotated about the central axis at a radial angle of between 0-89° relative to the first pair of electrodes.

13. The system of claim 12, wherein the first pair of dipoles are disposed at a first diameter around the central axis and the second pair of dipoles are disposed at a second diameter, different than the first diameter, about the central axis.

14. The system of claim 1, wherein the magnetic gradiometer comprises:
a first pair of dipoles symmetrically arranged around a central axis and spaced apart from one another; and
a second pair of dipoles arranged around the central axis and spaced apart from one another, wherein a relative angle of between 0-89° is formed between the first and second pair of electrodes.

15. The system of claim 14, wherein the first pair of dipoles are disposed at a first diameter around the central axis and the second pair of dipoles are disposed at a second diameter, different than the first diameter, about the central axis.

16. The system of claim 15, wherein the second pair of dipoles are rotated about the central axis at a radial angle of between 0-89° relative to the first pair of dipoles.

17. The system of claim 16, wherein the first pair of dipoles is disposed at a first diameter around the central axis and the second pair of dipoles is disposed at a second diameter, different than the first diameter, about the central axis.

18. The system of claim 1, further comprising a first insulator and a second insulator disposed along the BHA axis, wherein the emitter electrode is separated from the return by the first insulator and one of the emitter or receiver electrodes is separated from the magnetic gradiometer by the second insulator.

19. The system of claim 18, further comprising a third electrode and a third insulator disposed along the BHA axis, wherein the third electrode is electrically isolated from the other electrodes by the third insulator.

20. The system of claim 1, further comprising:
an insulator disposed between the emitter electrode and the magnetic gradiometer, insulating the magnetic gradiometer from current flow from the emitter electrode along the BHA; and
an insulator disposed between the emitter and the return electrodes, insulating the return electrode from current flow from the emitter electrode along the BHA.

21. The system of claim 1, wherein the magnetic gradiometer is disposed along the axis of the BHA between the emitter electrode and the return electrode.

22. The system of claim 21, further comprising:
an insulator disposed between the emitter electrode and the magnetic gradiometer, insulating the magnetic gradiometer from current flow from the emitter electrode along the BHA; and
an insulator disposed between the return electrode and the magnetic gradiometer, insulating the magnetic gradiometer from current flow from the return electrode along the BHA.

23. The system of claim 1, further comprising an elongated conductive member disposed in a portion of one wellbore and the BHA disposed in the other wellbore.

24. The system of claim 1, further comprising a drill string, wherein the BHA is carried by the drill string, the system further comprising a drill bit and a steering module carried by the drill string.

25. The system of claim 1, further comprising:
a first insulator disposed along the axis between the emitter and the return electrodes, insulating the return electrode from current flow from the emitter electrode along the BHA; and
a second insulator disposed along the axis on the opposite side of the return electrode from first insulator.

26. A wellbore ranging method comprising:
drilling a first wellbore and positioning an elongated conductive member within a portion of the first wellbore;
commencing the drilling of a second wellbore;
positioning a return electrode along a pipe string in the second wellbore;
positioning an emitter electrode along a pipe string in the second wellbore and electrically insulating the emitter electrode from the return electrode on the pipe string;
activating an alternating current and delivering the alternating current to the emitter electrode;
utilizing the emitter electrode to generate a magnetic field from the first wellbore; and
measuring an absolute magnetic field and a gradient magnetic field from the second wellbore based on the magnetic field generated from the first wellbore, where the combination of both the absolute magnetic field values and gradient magnetic field values are used to determine the distance and direction of the conductive member positioned in the first wellbore relative to the second wellbore.

27. The method of claim 26, further comprising positioning a gap sub along the pipe string between the emitter electrode and the return electrode.

28. The method of claim 26, further comprising positioning a gap sub along the pipe string between the emitter electrode and an EM sensor utilized to measure magnetic gradient.

29. The method of claim 26, further comprising positioning along the pipe string an EM sensor utilized to measure magnetic gradient between the return electrode and the emitter electrode.

30. The method of claim 29, further comprising positioning a gap sub along the pipe string between the emitter electrode and an EM sensor and positioning a gap sub along the pipe string between the return electrode and an EM sensor.

31. The method of claim 29, wherein the step of utilizing comprises transmitting current to the emitter electrode.

32. The method of claim 29, wherein the step of measuring comprises collecting magnetic field data, calculating a magnetic field gradient, and calculating a distance and direction between the first and second wells based on the magnetic field gradient.

* * * * *